United States Patent
Kawashima et al.

(10) Patent No.: US 8,118,347 B2
(45) Date of Patent: Feb. 21, 2012

(54) STRUCTURE OF MOUNTING IMPACT ABSORPTION MATERIAL FOR USE WITH VEHICLE

(75) Inventors: Akihiro Kawashima, Chiryu (JP); Masami Uratsu, Aichi-ken (JP); Michinori Kawasumi, Toyota (JP); Eiji Fujii, Okazaki (JP); Tomonari Masuda, Toyota (JP); Tadashi Nishimura, Toyota (JP); Mariko Wada, Nagoya (JP); Mamoru Yamaguchi, Toyokawa (JP); Kenichi Uemori, Nagoya (JP)

(73) Assignees: Toyota Boshoku Kabushiki Kaisha, Aichi-ken (JP); Hayashi Telempu Co., Ltd., Aichi-ken (JP)

( * ) Notice: Subject to any disclaimer, the term of this patent is extended or adjusted under 35 U.S.C. 154(b) by 77 days.

(21) Appl. No.: 12/791,932

(22) Filed: Jun. 2, 2010

(65) Prior Publication Data

US 2010/0308621 A1    Dec. 9, 2010

(30) Foreign Application Priority Data

Jun. 5, 2009    (JP) ................................ 2009-136106

(51) Int. Cl.
    *B60J 7/00*    (2006.01)
(52) U.S. Cl. ................................. 296/187.05
(58) Field of Classification Search ............ 296/187.05, 296/187.03, 187.01, 146.6, 146.7, 146.5, 296/187.02, 187.07, 187.12; 349/58
See application file for complete search history.

(56) References Cited

U.S. PATENT DOCUMENTS

| | | | | |
|---|---|---|---|---|
| 3,808,743 | A | * | 5/1974 | Renner et al. ................ 49/502 |
| 3,964,208 | A | * | 6/1976 | Renner et al. ................ 49/502 |
| 4,783,114 | A | * | 11/1988 | Welch ........................ 296/153 |
| 5,573,298 | A | | 11/1996 | Walker et al. |
| 5,588,692 | A | * | 12/1996 | Gandhi et al. ............. 296/146.7 |
| 5,603,548 | A | | 2/1997 | Gandhi et al. |
| 6,474,721 | B2 | * | 11/2002 | Nishikawa et al. ........ 296/146.6 |
| 6,631,940 | B2 | * | 10/2003 | Dauvergne et al. ........ 296/146.6 |
| 7,121,611 | B2 | * | 10/2006 | Hirotani et al. ............ 296/146.7 |
| 7,404,593 | B2 | | 7/2008 | Cormier et al. |
| 8,016,344 | B2 | * | 9/2011 | Tamada .................. 296/187.03 |
| 2002/0017805 | A1 | | 2/2002 | Carroll, III et al. |
| 2006/0145490 | A1 | * | 7/2006 | Yamaguchi et al. ......... 293/109 |
| 2008/0116722 | A1 | * | 5/2008 | Garcia et al. ................. 296/208 |
| 2009/0250966 | A1 | | 10/2009 | Suzuki et al. |

FOREIGN PATENT DOCUMENTS

DE    4038659    6/1991

(Continued)

OTHER PUBLICATIONS

Toshihiro Suzuki et al., "Mounting Structure of Side-Impact-Resistant Resin-Made Shock Absorbing Member", U.S. Appl. No. 12/756,234, Apr. 2010, PP.

*Primary Examiner* — Kiran B. Patel
(74) *Attorney, Agent, or Firm* — Freenblum & Berstein, P.L.C.

(57) ABSTRACT

An aspect in accordance with the present invention is a structure of mounting an impact absorption material for use with a vehicle. The structure includes: a door trim 30, a holder, and an EA pad. The holder includes a base and a plurality of legs, the base of the holder being disposed on the compartment outer side surface of the EA pad. The plurality of legs are disposed at intervals around an outer peripheral edge of the base of the holder and extend from the base of the holder, along an outer peripheral side surface of the EA pad, and to the door trim, thereby fixing the base of the holder to the door trim.

4 Claims, 9 Drawing Sheets

FOREIGN PATENT DOCUMENTS

| | | |
|---|---|---|
| EP | 0863056 | 9/1998 |
| JP | 5-22218 | 1/1993 |
| JP | 2000-6741 | 1/2000 |
| JP | 2005-8054 | 1/2005 |
| JP | 2005-514560 | 5/2005 |
| JP | 2008-524065 | 7/2008 |

* cited by examiner though vertical shaking. This can result in falling of the impact absorption materials.

STRUCTURE OF MOUNTING IMPACT ABSORPTION MATERIAL FOR USE WITH VEHICLE

CROSS REFERENCE TO RELATED APPLICATION

This application claims priority from Japanese Patent Application No. 2009-136106 filed on Jun. 5, 2009. The entire content of this priority application is incorporated herein by reference.

TECHNICAL FIELD

The present invention relates to a structure of mounting an impact absorption material for use with a vehicle.

BACKGROUND

Typically, impact absorption materials are fixed directly to interior materials of vehicles. For example, a known impact absorption material has a lug that is fixed to a steel plate of a vehicle body with screws. Another known impact absorption material has a thin-plate flange. The flange projects from the outer periphery of the impact absorption material and is fixed to the vehicle body with fixing members. Furthermore, another known impact absorption material is fixed directly to an interior material with an adhesive agent. Under normal conditions (under conditions other than side collision), however, the fixed portions of the impact absorption materials can be damaged by long-term continuing shaking. This can result in falling of the impact absorption materials.

In order to avoid this, a conceivable replacement of such direct fixation of the impact absorption material to the interior material is fixation via a holder provided separately from the impact absorption material. In this case, the impact absorption material will be placed between the holder and the interior material; and then, the holder will be fixed directly to the interior material. The holder will have, for example, an accommodating body having a concavity, and a lug to fix the accommodating body to the interior material. With this structure, the impact absorption material can be accommodated in the accommodating body, while the lug can be fixed to the interior material. This can prevent the impact absorption material from falling.

However, the accommodating body will have a frame that surrounds a peripheral surface of the impact absorption material. The frame tends to withstand an impact while transferring the impact onto the interior material. This results in a higher load on the occupant in the event of side collision. Namely, in order that the load on the occupant is less, the holder needs to have a lower strength. Thus, to provide the lower strength of the holder in the event of side collision and to prevent the impact absorption material from falling under the normal conditions are mutually contradictory problems, and solving both problems together is difficult.

Thus, there is a need for a structure that makes it possible to overcome these contradictory problems together.

SUMMARY

An aspect in accordance with the present invention is a structure of mounting an impact absorption material for use with a vehicle. The vehicle includes a body having a body panel. The structure includes: an interior material that is disposed in a manner facing a compartment inner side of the body panel; a holder disposed between the interior material and the body panel; and an impact absorption material disposed between the interior material and the holder. The impact absorption material includes a compartment outer side surface, a compartment inner side surface, and an outer peripheral side surface disposed between the compartment outer side surface and the compartment inner side surface. The compartment outer side surface faces the body panel. The holder includes a base and a plurality of legs, the base of the holder being disposed on the compartment outer side surface of the impact absorption material. The plurality of legs are disposed at intervals around an outer peripheral edge of the base of the holder and extend from the base of the holder, along the outer peripheral side surface of the impact absorption material, and to the interior material, thereby fixing the base of the holder to the interior material.

With this configuration, the impact absorption material is disposed between the holder and the interior material, while the legs of the holder are fixed to the interior material, and thereby the impact absorption material can be mounted between the interior material and the base. Specifically, because the legs are disposed around the peripheral surface of the impact absorption material, the possibility that the impact absorption material falls from the base under normal conditions can be remote. This makes it possible to surely buckle the impact absorption material while holding the impact absorption material with the holder in the event of side collision. Furthermore, because the holder includes the legs disposed at intervals around the peripheral edge of the base, the holder can have a lower strength in the event of side collision.

DETAILED DESCRIPTION

Embodiment

Figure 5:
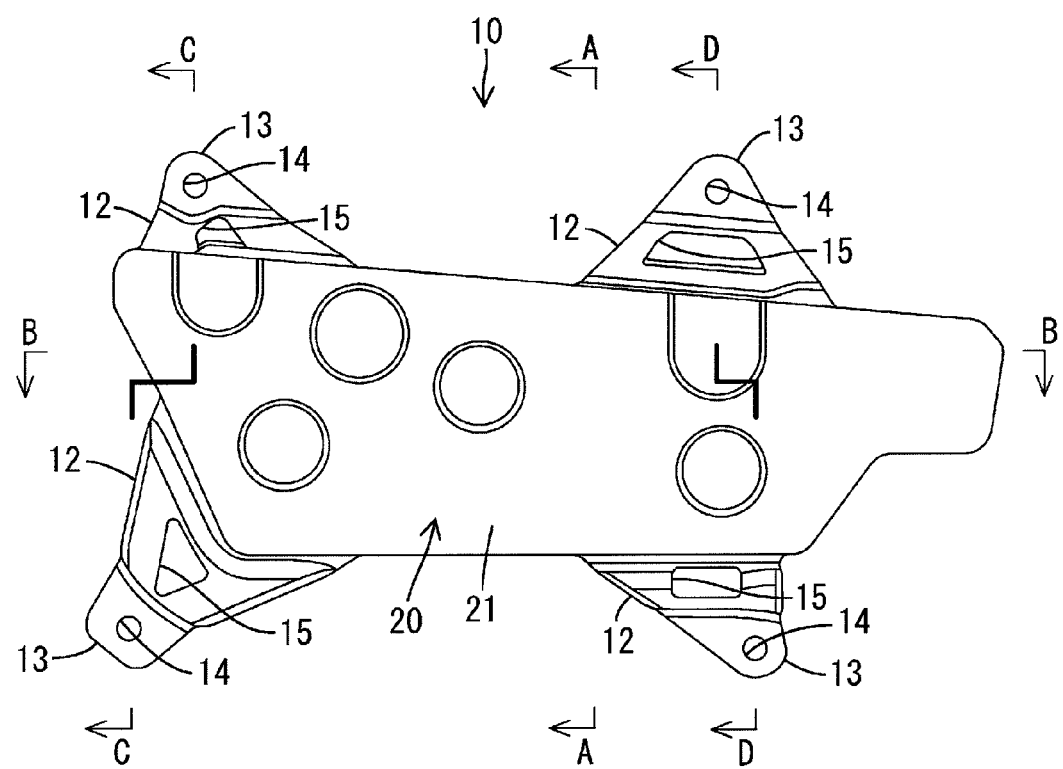
FIG. 5 is a plan view of the holder and the EA pad fixed to the holder as viewed from the compartment inside.
Figure 6:
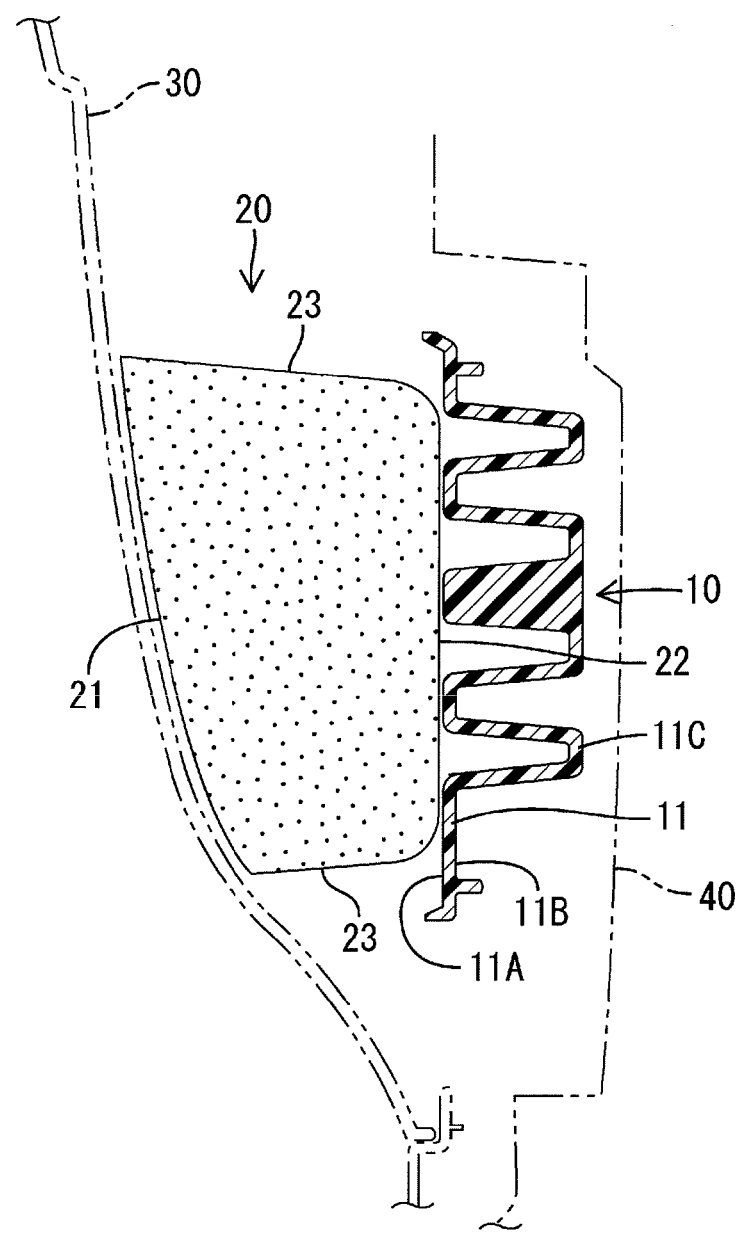
FIG. 6 is a sectional view along line A-A in FIG. 5.

An embodiment in accordance with the present invention will be described with reference to FIGS. 1 through 9. In this embodiment, a door body corresponds to a "body". The door body includes a door panel 40 (corresponding to a "body panel"), a door impact beam (not illustrated in the drawings), etc. As illustrated in FIGS. 6 through 9, a door trim 30 (corresponding to an "interior material") is disposed in a manner facing a compartment inner side of the door panel 40. An EA pad 20 (corresponding to an "impact absorption material") is adhered to a holder 10 with an adhesive agent such as hot-melt adhesive etc. The left side in FIG. 6 represents the compartment inner side, while the right side in FIG. 6 represents the compartment outer side.

The door trim 30 is made by integral molding or by a plurality of vertically separated and jointed boards. The door trim 30 is made of synthetic resin (such as polypropylene), mixture of wood-based material and synthetic resin, etc. A skin (not illustrated in the drawings) is adhered to a part, or to an entire, of the compartment inner side of the door trim 30.

The EA pad 20 is a rigid polyurethane foam plate. As illustrated in FIG. 5, the EA pad 20 of this embodiment is a block that is substantially rectangular and elongated in a back-and-forth direction of the vehicle. The EA pad 20 is disposed on the compartment outer side surface of the door trim 30. The EA pad 20 is disposed such that, when the occupant is on the sheet (not illustrated in the drawings), the EA pad 20 faces the waist of the occupant across the door trim 30 to absorb, and reduce, the impact on the occupant in the event of side collision.

As illustrated in FIG. 6, the EA pad 20 has a compartment inner side surface 21, a compartment outer side surface 22, and a side surface 23. The compartment inner side surface 21 is curved so as to fit the compartment outer side surface of the door trim 30. The compartment outer side surface 22 is flat and vertical. The side surface 23 is a peripheral surface disposed between the compartment inner side surface 21 and the compartment outer side surface 22. The side surface 23 connects the outer peripheral edge of the compartment inner side surface 21 with the outer peripheral edge of the compartment outer side surface 22. The area of the compartment inner side surface 21 is slightly greater than the area of the compartment outer side surface 22.

As illustrated in FIGS. 1 through 4, the holder 10 includes a base 11 and four legs 12 for fixing the base 11 to the door trim 30. The base 11 is disposed on the compartment outer side surface 22 of the EA pad 20. The holder 10 is made of polypropylene resin etc. As the difference between FIGS. 1 and 2 (or between FIGS. 3 and 4) shows, the base 11 has a shape to fit an outer periphery of the EA pad 20. In other words, the base 11 covers the compartment outer side surface 22 of the EA pad 20. Because of this, the impact from the compartment outer side is transferred to the EA pad 20 indirectly, i.e. via the base 11.

The base 11 is provided as above for a following reason. In the event of side collision, the door panel 40, the door impact beam, etc. possibly come into contact with the EA pad 20. Because the door panel 40 is comparatively softer than the door impact beam, the door panel 40 easily deforms in the event of side collision, and its shape after deformation is difficult to predict. Then, in a case where the door panel 40 deforms into a shape having a projection, the projection comes into contact with, and only partially depresses, the EA pad 20. Similar to this, also in a case where the door impact beam comes into contact with the EA pad 20, the door impact beam only partially depresses the EA pad 20. In either case, depressing the entire of the EA pad 20 is impossible, which results in a lower impact absorption performance. The base 11 has been provided to prevent such an inconvenience. Thus, the entire of the EA pad 20 can be buckled via the base 11, so that the impact can be reliably absorbed.

Figure 1:
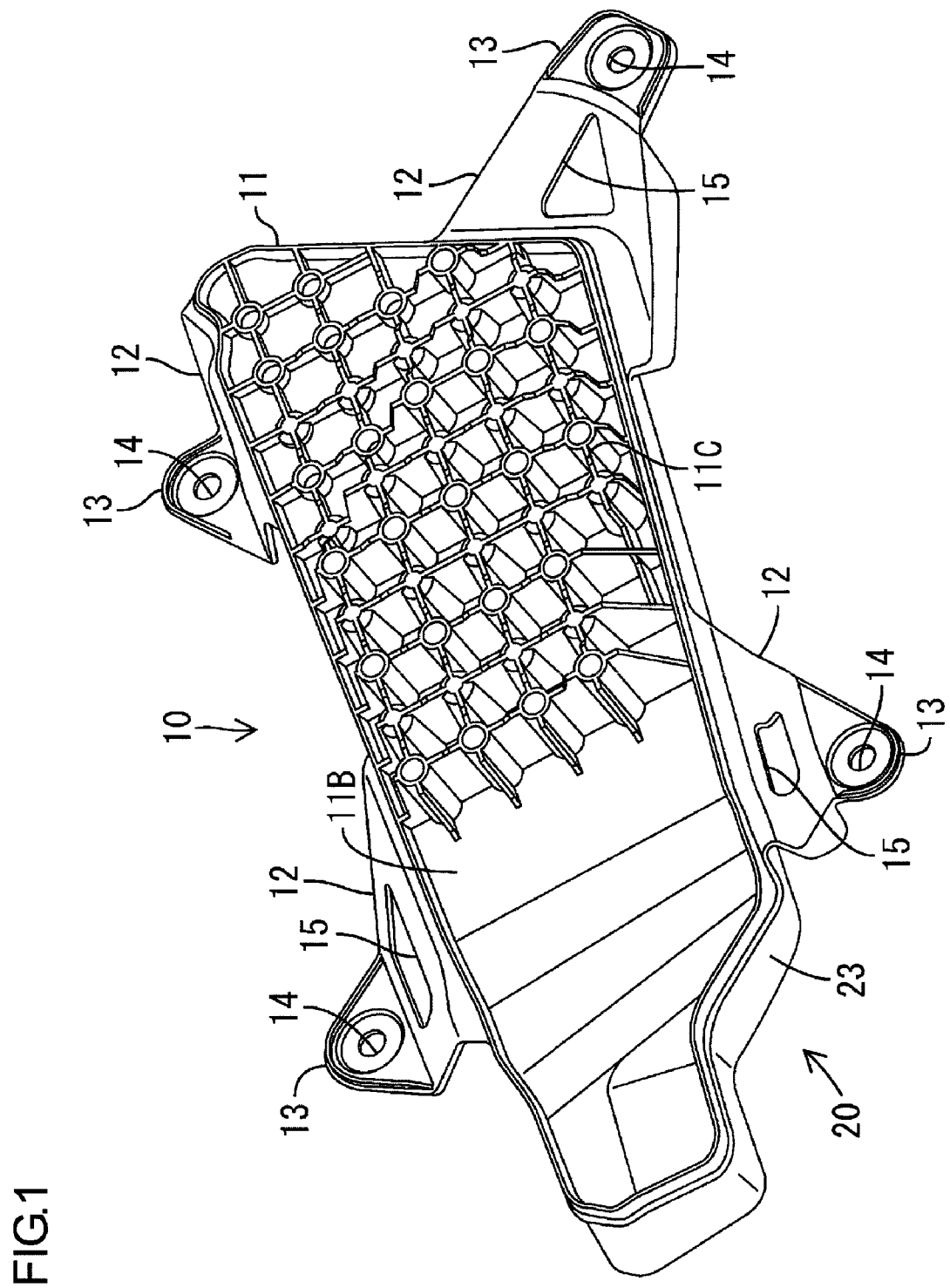
FIG. 1 is a perspective view of a holder and an EA pad fixed to the holder.
Figure 2:
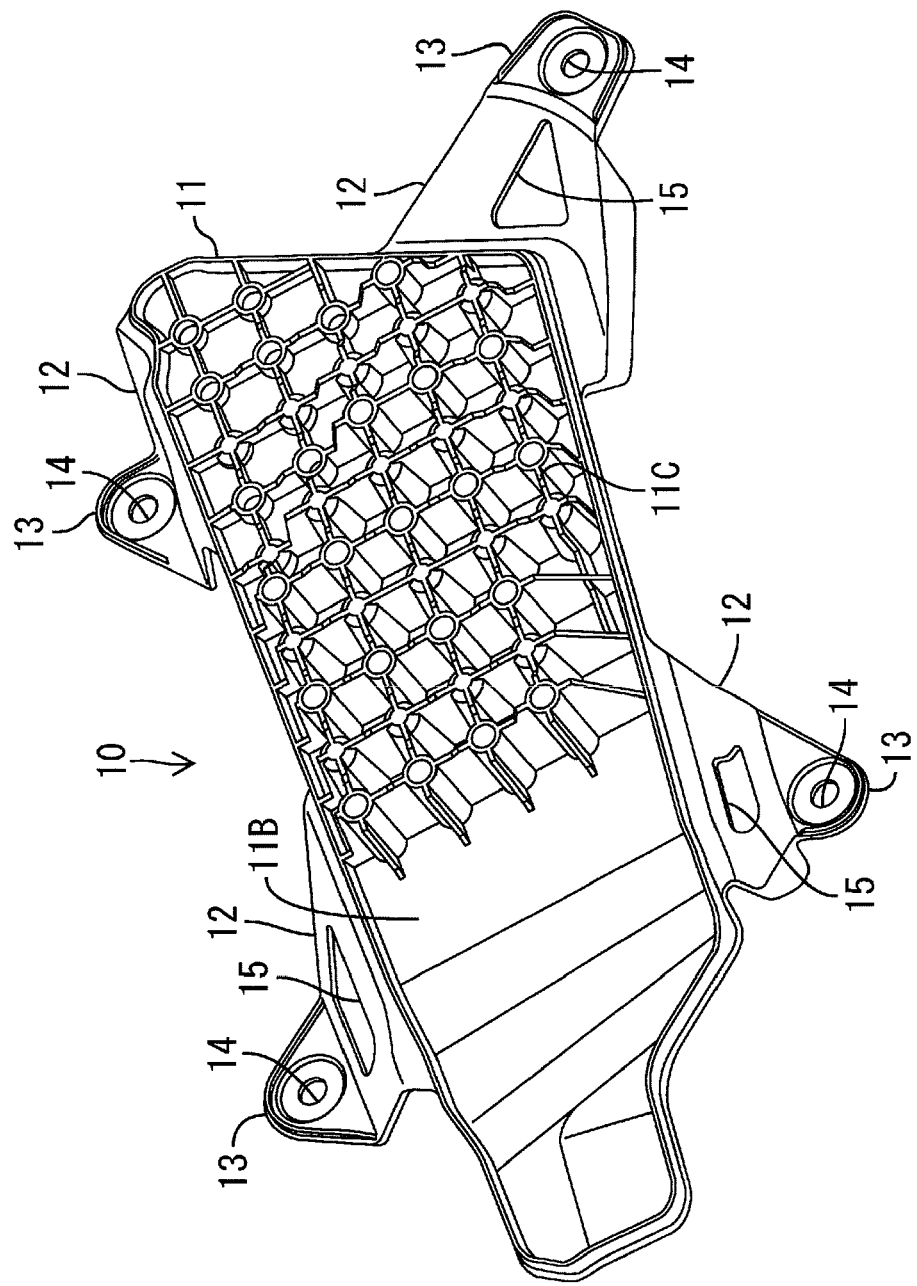
FIG. 2 is a perspective view of the holder alone.
Figure 3:
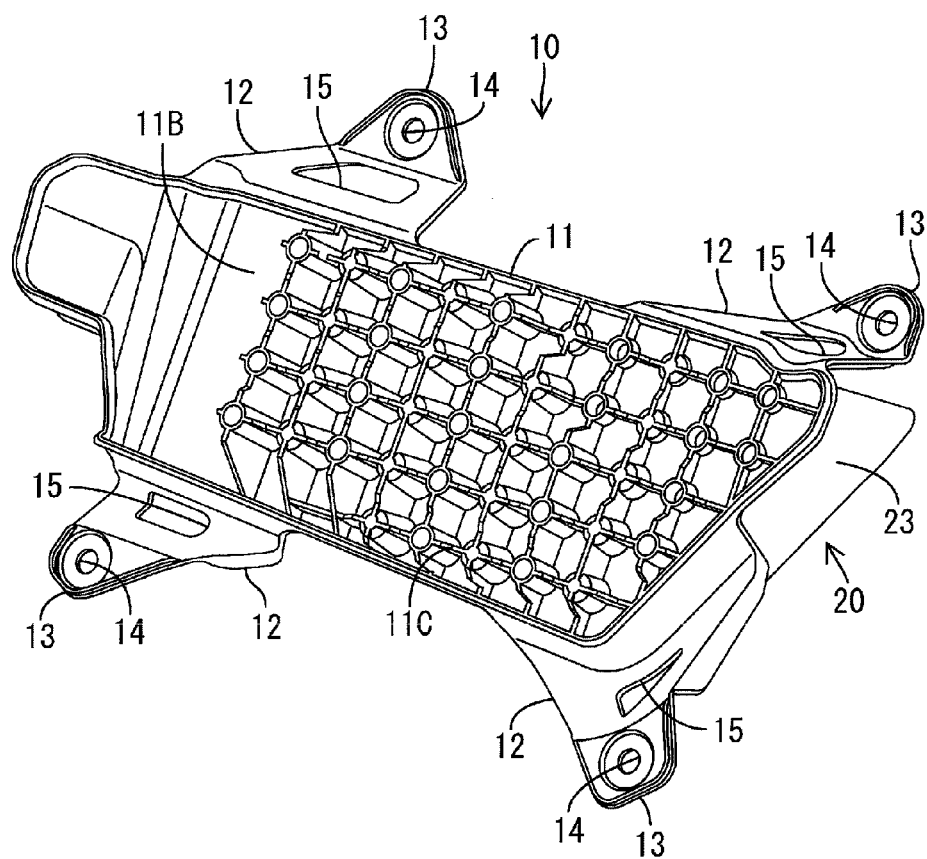
FIG. 3 is a perspective view of the holder and the EA pad fixed to the holder, as viewed from another side.
Figure 4:
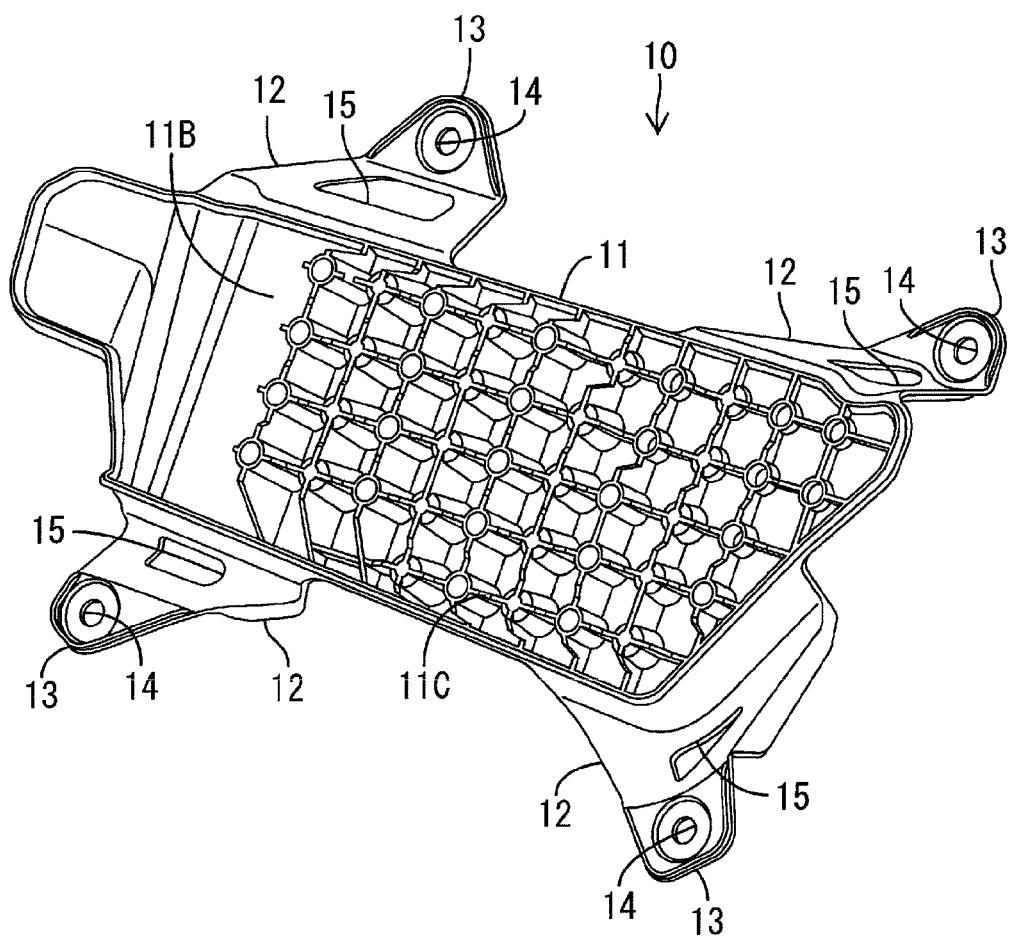
FIG. 4 is a perspective view of the holder alone, as viewed from another side.

The base 11 has a space reducing portion 11C (corresponding to a "space reducer") that reduces a space defined by the base 11 and the door panel 40. As illustrated in FIG. 6, the space reducing portion 11C protrudes from a compartment outer side surface 11B of the base 11 (a surface opposite from the EA pad 20) toward the compartment outer side. The space reducing portion 11C can shorten a time period from the moment of the side collision to the moment when the base 11 starts to apply a load on the EA pad 20. In other words, the space reducing portion 11C can shorten a distance (a free running distance) from the door panel 40 to the base 11. As illustrated in FIG. 1, the space reducing portion 11C includes partition walls and cylindrical (or columned) portions that connect the partition walls into a lattice.

Distal ends of the legs 12 extend outward to form respective lugs 13. Each lug 13 has an attachment hole 14 throughout the thickness thereof. On the other hand, the door trim 30 has mounts 31, wherefrom respective bosses 32 protrude. The bosses 32 are inserted in the respective attachment holes 14 and are deformed by ultrasonic welding etc. so that the lug 13 is fixed to the mounts 31 of the door trim 30. Thus, the holder 10 is fixed to the door trim 30, while the EA pad 20 is fixed in a state held between the door trim 30 and the base 11. Note here that the holder 10 is not damaged even when subjected to a long-term continuous shaking. Because such a holder 10 supports the EA pad 20, the EA pad 20 under the normal conditions (other than side collision) is scarcely damaged, and, accompanying this, there is no possibility that the EA pad 20 falls.

Figure 8:
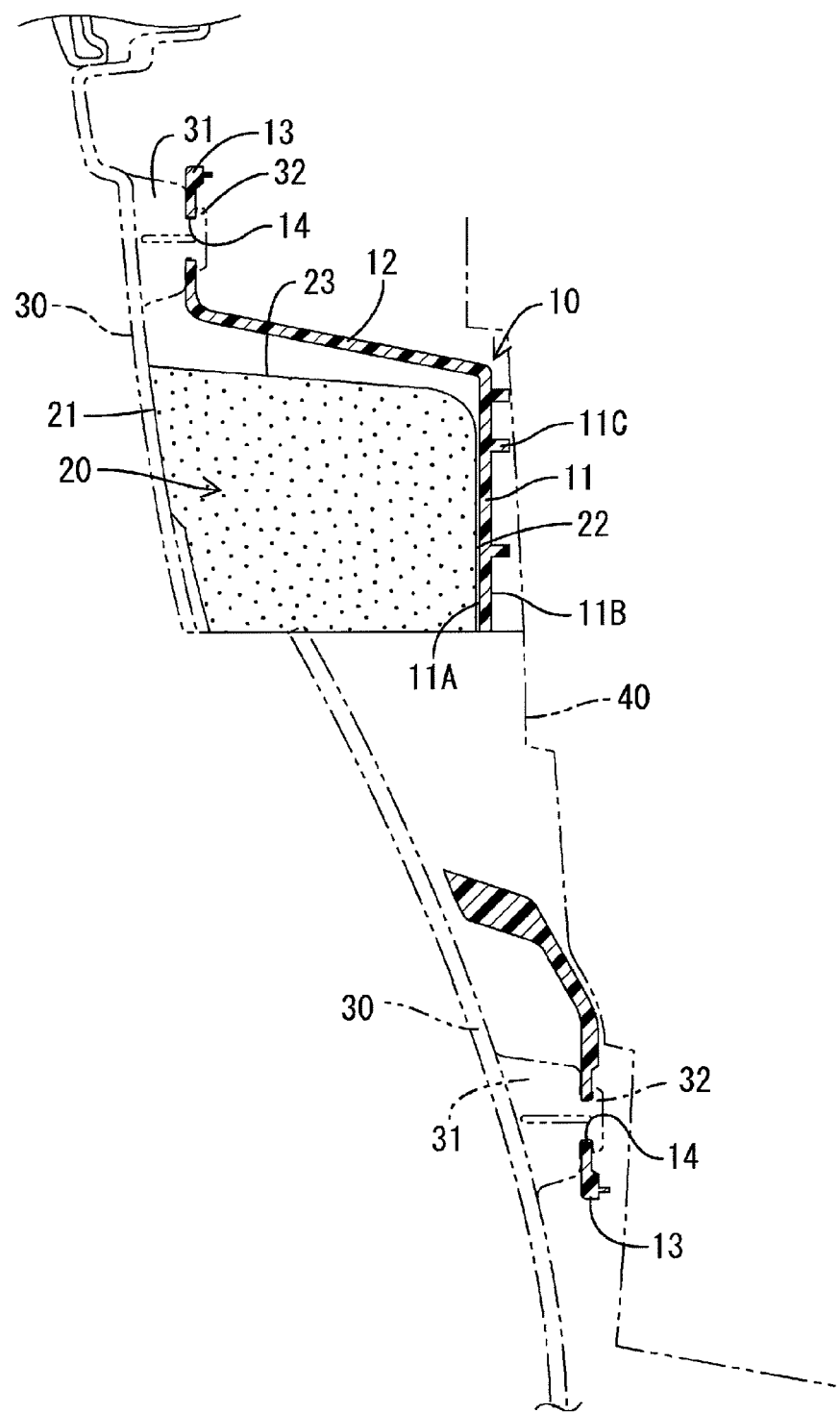
FIG. 8 is a sectional view along line C-C in FIG. 5.
Figure 9:
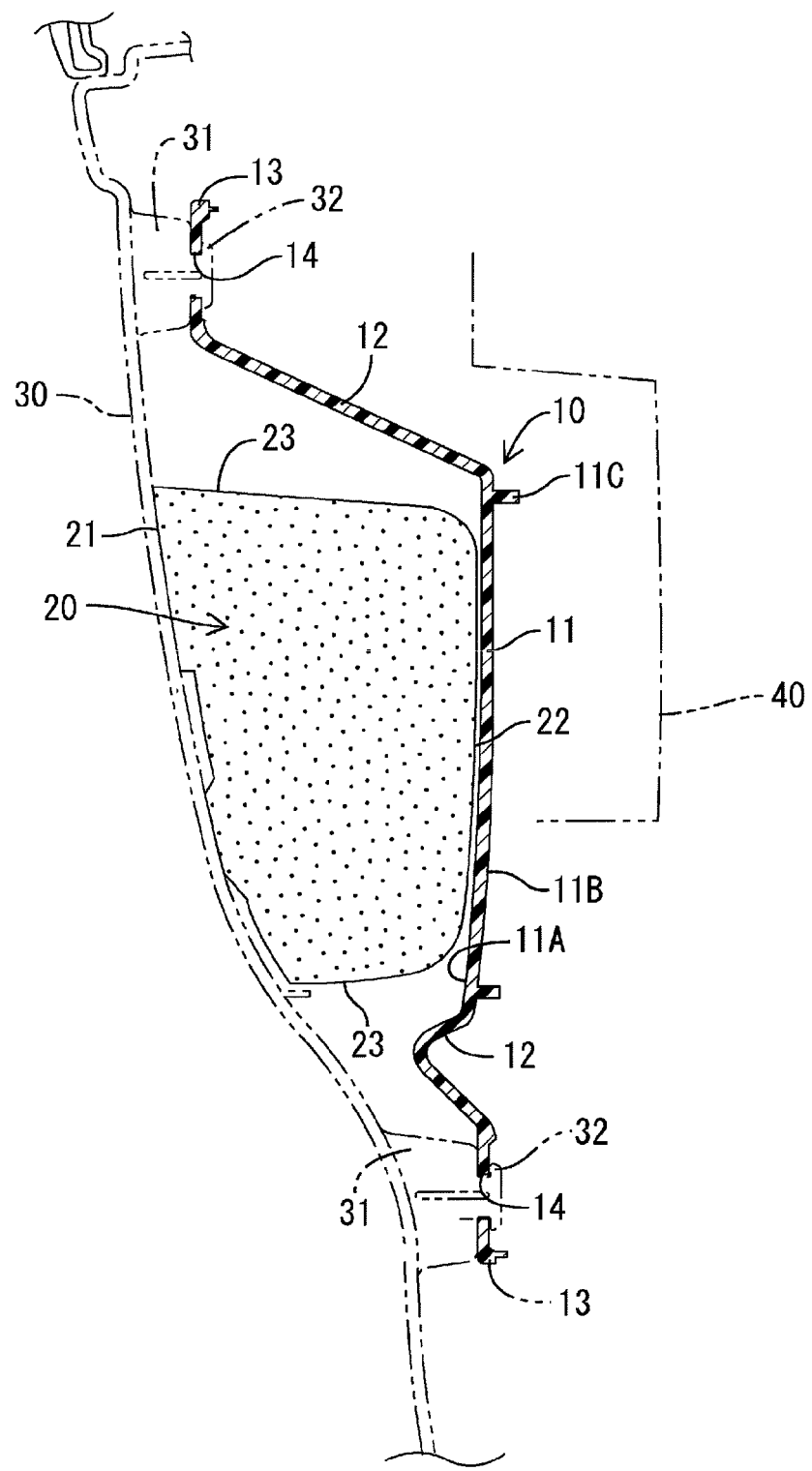
FIG. 9 is a sectional view along line D-D in FIG. 5.

Now referring to FIG. 5, the four legs 12 are disposed at intervals around the outer peripheral edge of the base 11. As illustrated in FIG. 8 or 9, the legs 12 extend from the outer peripheral edge of the base 11, along the side surface 23 of the EA pad 20, and to the door trim 30. As illustrated in FIG. 5, the legs 12 are disposed substantially at four corners of the base 11, i.e. are disposed apart from each other, in a manner surrounding the EA pad 20 as a whole. This provides a lower strength of the holder 10 than the strength of a holder having a leg entirely surrounding the outer periphery of the base 11, reducing the possibility that the legs 12 withstand the impact in the event of side collision. In addition to this, holes 15 are provided so as to further reduce the strength of the holder 10. Specifically, each hole 15 is defined in each leg and is disposed between each lug 13 and the outer peripheral edge of the base 11. Thus, the legs 12 can still less withstand the impact in the event of side collision. Thus, there is no possibility that the EA pad 20 is blocked from buckling.

Figure 7:
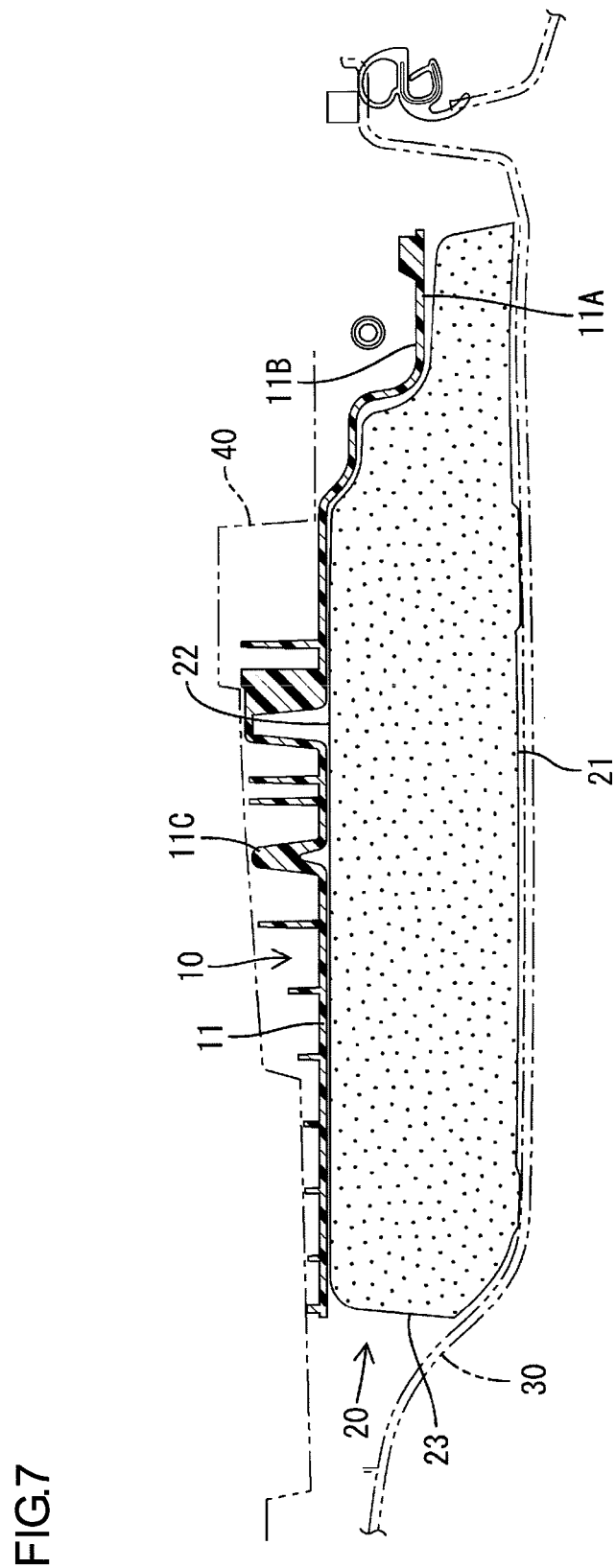
FIG. 7 is a sectional view along line B-B in FIG. 5.

The possibility of falling of the EA pad 20 is reduced by, in addition to the fixation to the base 11, by the four legs 12. Specifically, a pair (the left pair in FIG. 5) of an upper and a lower legs 12 (see FIG. 8) and the other pair (the right pair in FIG. 5) of an upper and a lower legs 12 (see FIG. 9) limit the up-down movement of the EA pad 20. On the other hand, as illustrated in FIG. 7 (a sectional view along line B-B in FIG. 5), the distance between the base 11 and the door trim 30 is gradually smaller toward the front and the back ends of the EA pad 20 in the back-and-forth direction of the vehicle. This limits the movement of the EA pad 20 in the back-and-forth direction of the vehicle. Thus, because the four legs 12 surround the EA pad 20, there is no possibility that the EA pad 20 falls out of the space between the door trim 30 and the base 11.

Operational functions of this embodiment will hereinafter be described. First, the EA pad 20 is mounted to the door trim 30 in the manner as follows: a) the EA pad 20 is fixed to a compartment inner side surface 11A of the base 11 with an adhesive agent; and b) the holder 10 is mounted, and is fixed, to the door trim 30. In this state, as illustrated in FIGS. 6 through 9, the plurality of legs 12 hold the EA pad 20 therebetween at least in the up-down direction. Therefore, even when the holder 10 and the EA pad 20 are subjected to long-term continuing shaking under the normal conditions, there is no possibility that the EA pad 20 is damaged. Thus, the EA pad 20 is prevented from falling.

Furthermore, the EA pad 20 is held, and is fixed, between the door trim 30 and the base 11. Accordingly, in the event of side collision, the door panel 40 comes into contact with the space reducing portion 11C, and the base 11 depresses and buckles the EA pad 20. The EA pad 20 thus can absorb the impact. Furthermore, even upon contact of the door impact beam with the space reducing portion 11C, the base 11 depresses and buckles the EA pad 20. Thus, the EA pad 20 can surely absorb the impact.

Furthermore, the legs 12 are disposed at intervals around the outer peripheral edge of the base 11, so that the strength of the holder 10 can be lower. In addition to this, because of the holes 15 provided in the legs 12, the strength of the holder 10 can be still lower. Furthermore, the space reducing portion 11C provided on the base 11 can shorten the time period from the moment of side collision to the moment when the door panel 40 starts to apply the load on the EA pad 20.

Other Embodiments

The present invention is not limited to the embodiment described above with reference to the drawings. For example, following embodiments are also included within the scope of the present invention.

(1) In the above-described embodiment, the door body is illustrated as the body. In accordance with the present invention, in a case where, for example, the vehicle is a two-door four-seater coupe, the body may be a side body that faces the waist of the occupant on a rear seat.

(2) In the above-described embodiment, the EA pad 20 is illustrated as the impact absorption material. In accordance with the present invention, a resinous side-impact absorption material made of the same resin with the holder 10 may be used as the impact absorption material.

(3) In the above-described embodiment, the number of the legs 12 is four. In accordance with the present invention, the number of the legs 12 may be three, five, or more than five.

(4) In the above-described embodiment, the hole 15 is defined throughout the thickness of each leg 12. In accordance with the present invention, a thin-walled portion may be provided.

(5) In the above-described embodiment, the space reducer is the lattice-shaped space reducing portion 11C. In accordance with the present invention, the space reducer may be a cross-shaped rib. Furthermore, the space reducer may be buckled to function as the impact absorption material.

What is claimed is:

1. A structure of mounting an impact absorption material for use with a vehicle, the vehicle including a body having a body panel, the structure comprising:

an interior material that is disposed in a manner facing a compartment inner side of the body panel;

a holder disposed between the interior material and the body panel; and an impact absorption material disposed between the interior material and the holder, the impact absorption material including a compartment outer side surface, a compartment inner side surface, and an outer peripheral side surface disposed between the compartment outer side surface and the compartment inner side surface, the compartment outer side surface facing the body panel, wherein:

the holder includes a base and a plurality of legs, the base of the holder being disposed on the compartment outer side surface of the impact absorption material; and the plurality of legs are disposed at intervals around an outer peripheral edge of the base of the holder and extend from the base of the holder, along the outer peripheral side surface of the impact absorption material, and to the interior material, thereby fixing the base of the holder to the interior material.

2. The structure according to claim 1, wherein:

each of the plurality of legs includes a lug to be fixed to the interior material; and a hole is defined in each leg and is disposed between the lug and the base.

3. The structure according to claim 1, wherein:

the base of the holder and the body panel define a space;

the structure further comprising a space reducer extending from the base of the holder; and the space reducer reduces the space so that a distance between the space reducer and the body panel is smaller than a distance between the base and the body panel.

4. The structure according to claim 2, wherein:

the base of the holder and the body panel define a space;

the structure further comprising a space reducer extending from the base of the holder; and the space reducer reduces the space so that a distance between the space reducer and the body panel is smaller than a distance between the base and the body panel.

* * * * *